(12) United States Patent
Harada et al.

(10) Patent No.: US 9,748,813 B2
(45) Date of Patent: Aug. 29, 2017

(54) BOBBIN AND ROTARY ELECTRIC MACHINE

(71) Applicant: KABUSHIKI KAISHA YASKAWA DENKI, Kitakyushu-shi (JP)

(72) Inventors: Manabu Harada, Fukuoka (JP); Mitsuru Iwakiri, Fukuoka (JP); Masanobu Kakihara, Fukuoka (JP); Kensuke Nakazono, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 632 days.

(21) Appl. No.: 14/220,135

(22) Filed: Mar. 20, 2014

(65) Prior Publication Data

US 2014/0339935 A1 Nov. 20, 2014

(30) Foreign Application Priority Data

May 17, 2013 (JP) ................................. 2013-105636

(51) Int. Cl.
*H02K 3/34* (2006.01)
*H02K 3/46* (2006.01)
(Continued)

(52) U.S. Cl.
CPC ............... *H02K 3/50* (2013.01); *H02K 3/345* (2013.01); *H02K 1/148* (2013.01); *H02K 3/52* (2013.01); *H02K 2203/12* (2013.01)

(58) Field of Classification Search
CPC ...... H02K 1/148; H02K 2203/12; H02K 3/34; H02K 3/345; H02K 3/50; H02K 3/52; H02K 3/521; H02K 3/522
(Continued)

(56) References Cited

U.S. PATENT DOCUMENTS

| 2007/0224858 A1* | 9/2007 | Sonohara | ............... H01R 39/32 439/100 |
| 2008/0252181 A1* | 10/2008 | Suzuki | ..................... H01F 5/02 310/49.01 |
| 2012/0313628 A1* | 12/2012 | Van Nimmen | ........ H02K 1/146 324/207.15 |

FOREIGN PATENT DOCUMENTS

| CN | 102570650 | 7/2012 |
| JP | 09-308142 | 11/1997 |

(Continued)

OTHER PUBLICATIONS

JP 2008278694 (English Translation).*
(Continued)

*Primary Examiner* — Naishadh Desai
*Assistant Examiner* — Alexander Moraza
(74) *Attorney, Agent, or Firm* — Mori & Ward, LLP

(57) ABSTRACT

A bobbin for electrically insulating the stator core from a coil wire to be wound around the bobbin includes: a coil winding portion around which the coil wire is to be wound; and a terminal fixing portion to which a winding starting end portion and a winding finishing end portion of the coil wire are to be fixed. The terminal fixing portion includes a first groove configured to guide a winding starting section extending from the winding starting end portion of the coil wire to a winding starting position of the coil winding portion and a second groove configured to guide a winding finishing section extending from a winding finishing position of the coil winding portion to the winding finishing end portion of the coil wire to intersect the winding starting section when seen in an axial direction.

4 Claims, 19 Drawing Sheets

(51) Int. Cl.
*H02K 3/50* (2006.01)
*H02K 3/52* (2006.01)
*H02K 1/14* (2006.01)

(58) Field of Classification Search
USPC .................. 310/214, 215, 208, 179, 194
See application file for complete search history.

(56) References Cited

FOREIGN PATENT DOCUMENTS

| | | |
|---|---|---|
| JP | 2007-259543 | 10/2007 |
| JP | 2008-278694 A | 11/2008 |
| JP | 2008278694 A * | 11/2008 |
| JP | 2010-110048 | 5/2010 |
| JP | 2012-105484 | 5/2012 |
| JP | 2012105484 A * | 5/2012 |
| RU | 2352048 C1 * | 4/2009 |

OTHER PUBLICATIONS

JP 2012105484 (English Translation).*
Chinese Office Action for corresponding CN Application No. 201410102471.3, dated Feb. 26, 2016.
Japanese Office Action for corresponding JP Application No. 2013-105636, dated Apr. 30, 2015.
Korean Office Action for corresponding KR Application No. 10-2014-0031119, dated Aug. 6, 2015.
Chinese Office Action for corresponding CN Application No. 201410102471.3, dated Sep. 26, 2016.

* cited by examiner

BOBBIN AND ROTARY ELECTRIC MACHINE

CROSS-REFERENCE TO RELATED APPLICATION

The present disclosure contains subject matter related to that disclosed in Japanese Priority Patent Application No. 2013-105636 filed with the Japan Patent Office on May 17, 2013, the entire contents of which are incorporated herein by reference.

BACKGROUND OF THE INVENTION

Field of the Invention

An embodiment disclosed herein relates to a bobbin and a rotary electric machine provided with the bobbin.

Description of the Related Art

There is known a rotary electric machine that includes an armature core, teeth protruding inward from the armature core at a regular interval in a circumferential direction, armature coils wound around the teeth in a so-called concentrated winding manner in which a coil of a single pole and a single phase is concentratedly wound around each of the teeth, and bobbins mounted within slots provided between the adjacent teeth and configured to accommodate the armature coils (see, e.g., Japanese Patent Application Publication No. H09-308142).

SUMMARY OF THE INVENTION

In accordance with an aspect of the present disclosure, there is provided a bobbin adapted to be mounted to a stator core of a rotary electric machine and configured to electrically insulate the stator core from a coil wire to be wound around the bobbin, the bobbin including: a coil winding portion around which the coil wire is to be wound; and a terminal fixing portion to which a winding starting end portion and a winding finishing end portion of the coil wire are to be fixed, wherein the terminal fixing portion includes a first groove configured to guide a winding starting section extending from the winding starting end portion of the coil wire to a winding starting position of the coil winding portion and a second groove configured to guide a winding finishing section extending from a winding finishing position of the coil winding portion to the winding finishing end portion of the coil wire to intersect the winding starting section when seen in an axial direction.

DESCRIPTION OF THE EMBODIMENTS

An embodiment will now be described in detail with reference to the accompanying drawings.

<Configuration of Rotary Electric Machine>

Figure 1:
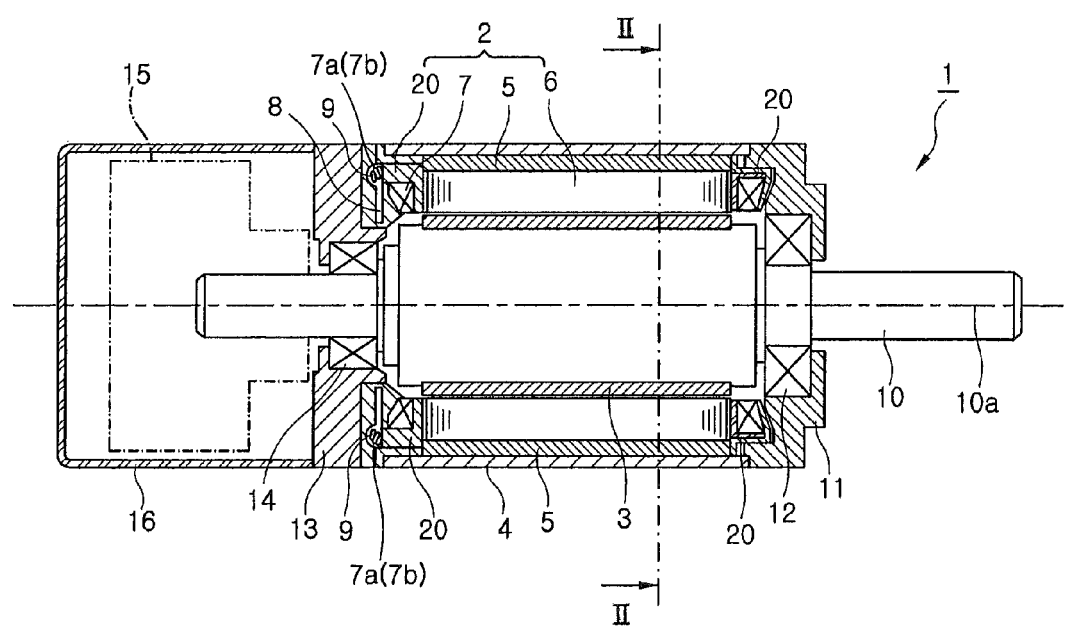
FIG. 1 is a longitudinal sectional view showing the overall configuration of a rotary electric machine provided with a bobbin according to an embodiment.

First, the configuration of a rotary electric machine 1 in accordance with an embodiment will be described with reference to FIGS. 1 and 2. As shown in FIG. 1, the rotary electric machine 1 includes a stator 2 and a rotor 3. The rotary electric machine 1 is an inner-rotor-type motor in which the rotor 3 is arranged inside the stator 2. The rotary electric machine 1 may be a generator. The stator 2 is arranged on an inner circumferential surface of a frame 4 through a laminated core ring 5 to radially face the rotor 3.

Figure 2:
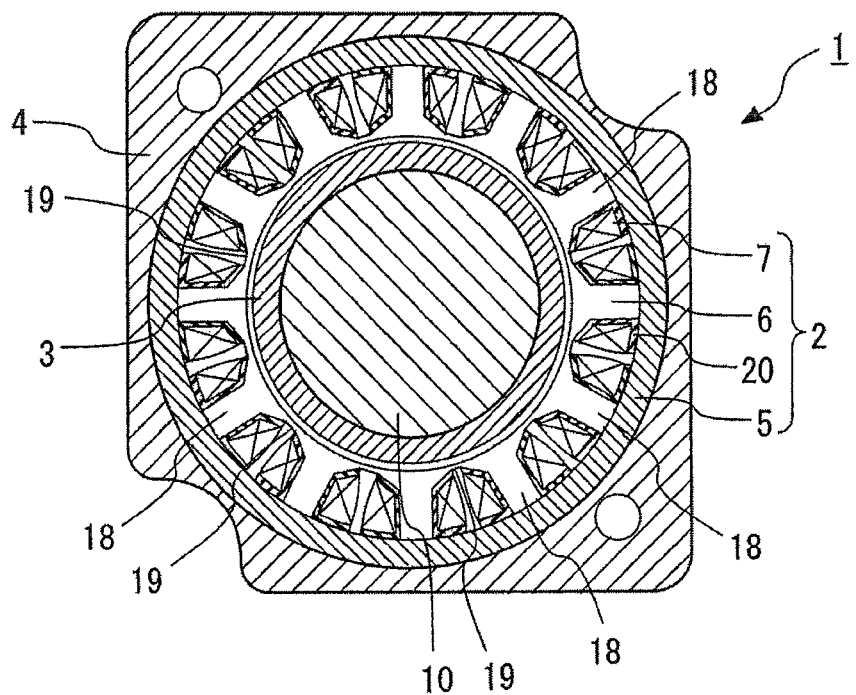
FIG. 2 is a cross sectional view taken along the line II-II in FIG. 1, showing the rotary electric machine provided with the bobbin according to the embodiment.

As shown in FIG. 2, the stator 2 includes a laminated core ring 5, a laminated core body 6 (a stator core), a plurality of bobbins 20 mounted to the laminated core body 6 and a plurality of coil wires 7 wound on the bobbins 20. The bobbins 20 are made of an insulating material (a resin or the like) in order to electrically insulate the laminated core body 6 from the coil wires 7. A substrate 8 (a wire connection substrate) is arranged at one axial end (the left end in FIG. 1) of the bobbins 20.

Figure 3:
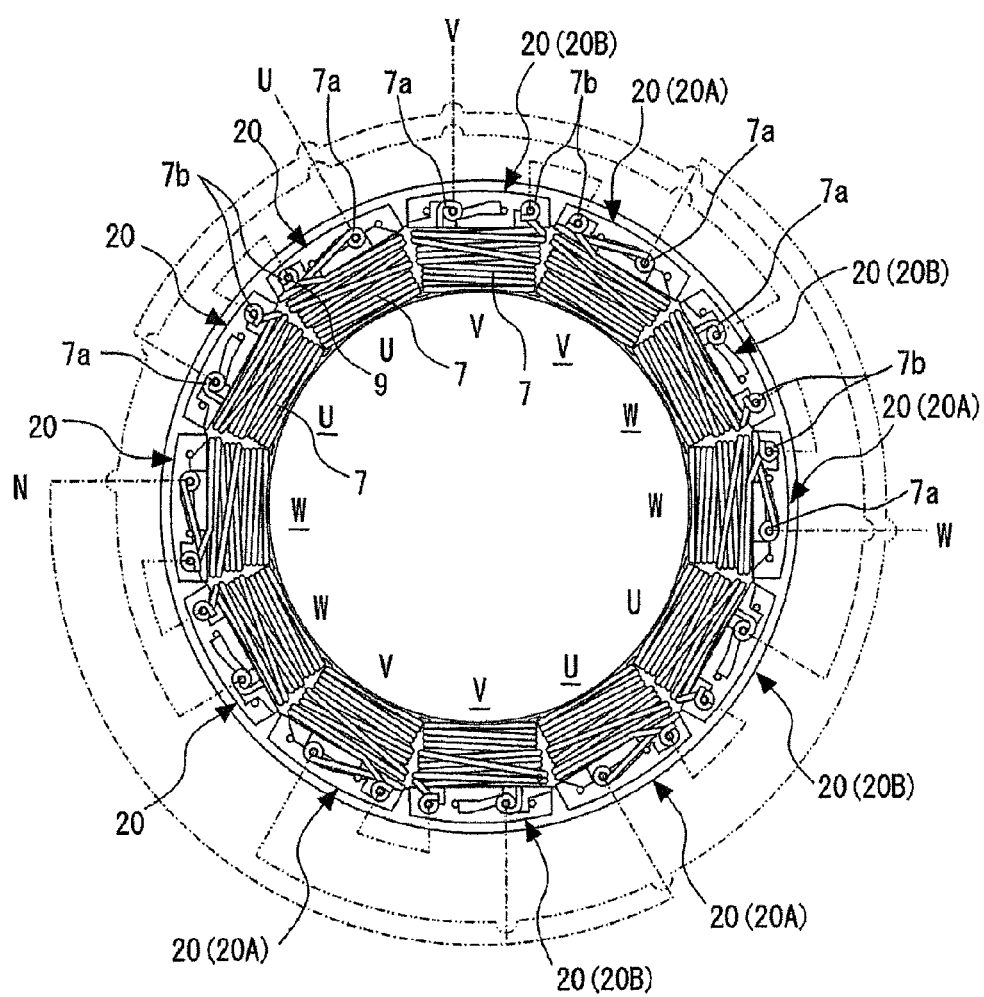
FIG. 3 is an explanatory view showing one arrangement example of bobbins in the rotary electric machine according to the embodiment.

The circuit arranged in the substrate 8 and the coil wires 7 wound on the bobbins 20 are electrically connected to each other through two square-bar-shaped pin terminals 9. As shown in FIG. 3, a winding starting end portion 7a and a winding finishing end portion 7b of each of the coil wires 7 are wrapped around the corresponding pin terminals 9 and are fixed by, e.g., solders (not shown).

The rotor 3 is formed of a permanent magnet and is provided on an outer circumferential surface of a shaft 10. The shaft 10 is rotatably supported by a load-side bearing 5 whose outer race is fitted to a load-side bracket 11 provided at the load side (the right side in FIG. 1) of the frame 4 and a counter-load-side bearing 14 whose outer race is fitted to a counter-load-side bracket 13 provided at the counter-load side (the opposite side to the load side, i.e., the left side in FIG. 1) of the frame 4. An encoder 15 is provided at the counter-load-side end portion of the shaft 10. The encoder 15 is covered with an encoder cover 16.

The laminated core body 6 is provided with a plurality of (e.g., twelve in FIG. 2) radial projections 18 which protrude radially outward. The bobbins 20 wound with the coil wires 7 are mounted to the respective projections 18 from the radial outer side. As shown in FIG. 2, in each of recesses 19 between the adjacent projections 18, the side portions of the bobbins 20 mounted to the respective projections 18, at which the winding layers of the coil wires 7 face each other, are disposed in a spaced-apart relationship with each other.

The bobbins 6 wound with the coil wires 7 are mounted to the laminated core body 6 and are then fixed to the inner circumferential surface of the laminated core ring 5 having an annular shape, thereby forming the stator 2. The stator thus formed is mounted to the inner circumferential surface of the frame 4. Thereafter, a resin is introduced into the recesses 19, whereby the bobbins 20 and the coil wires 7 are molded with the resin.

<Slot Combination of Rotary Electric Machine 1>

In the present embodiment, the rotary electric machine 1 is a rotary induction motor using a three-phase alternating current. As shown in FIG. 3, slot combination in section of the rotary electric machine 1 includes ten poles and twelve slots (10P and 12S) in case of a permanent magnet synchronous motor. In this slot combination, as shown in FIG. 3, the bobbins 20 (namely, the bobbins 20A and 20B) corresponding to the coils having the same phase but differing 180 degrees in electrical angle from each other are disposed adjacent to each other.

In FIG. 3, U, V and W designate the bobbins 20 corresponding to a U-phase, a V-phase and a W-phase. U, V and W designate the bobbins 20 differing 180 degrees in electrical angle from the bobbins U, V and W (This holds true in FIG. 7). In FIG. 3, further, the relationship of the wire connection patterns of individual phases in the substrate 8 to be described below is indicated by double-dot chain lines or single-dot chain lines.

<Detailed Structure of Bobbins 20>

Figure 4:
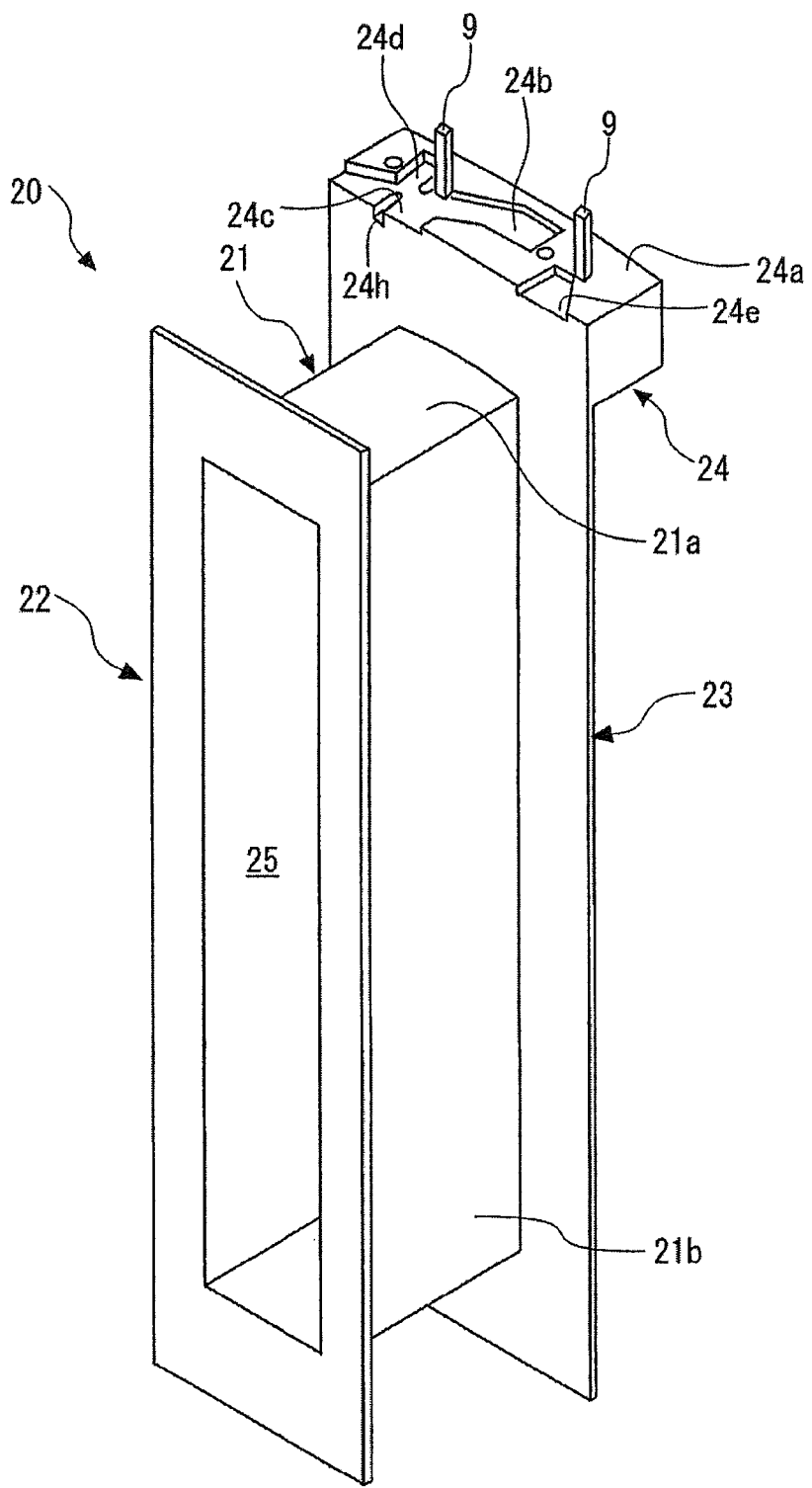
FIG. 4 is a perspective view of the bobbin according to the embodiment.
Figure 5:
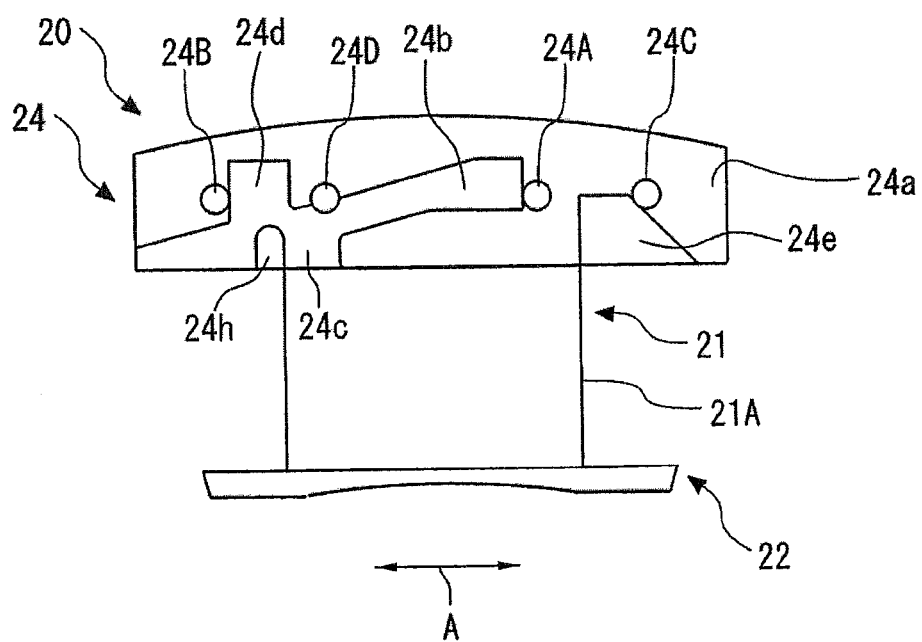
FIG. 5 is a plan view of the bobbin according to the embodiment.
Figure 6:
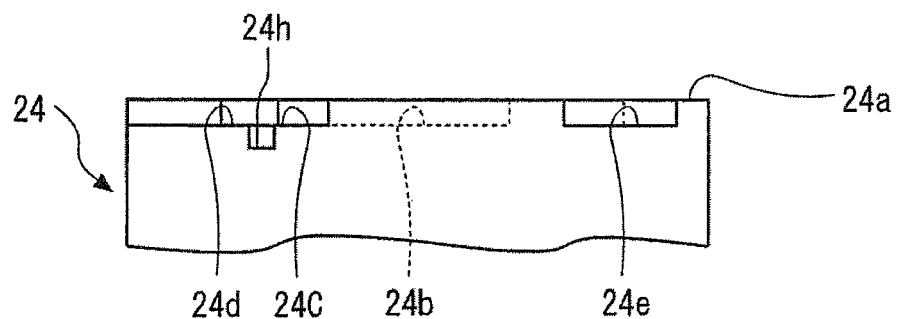
FIG. 6 is a front view of major portions of the bobbin according to the embodiment.

Next, the detailed structure of each of the bobbins 20 will be described with reference to FIGS. 4 to 8. In the rotary electric machine 1, the bobbins 20 (twelve bobbins 20 in the present embodiment) mounted to the laminated core body 6 has the same structure. As shown in FIGS. 4 to 6, each of the bobbins 20 includes a substantially quadrilateral frame-like trunk portion (a coil winding portion) 21 wound with the coil wire 7, a first flange portion 22 formed along the edge of one end of the trunk portion 21, a second flange portion 23 formed along the edge of the other end of the trunk portion 21, and a substrate mounting portion 24 installed in the second flange portion to mount thereon the substrate 8 and provided with a terminal fixing portion for fixing the winding starting end portion 7a and the winding finishing end portion 7b of the coil wire 7, which will be described later.

The trunk portion 21 includes coil winding surfaces 21a opposite to each other in the axial direction 10a of the stator 2 (the left-right direction in FIG. 1 and the up-down direction in FIG. 4) and coil winding surfaces 21b opposite to each other in the circumferential direction of the stator 2. The trunk portion 21 is formed into a hollow prismatic shape and is provided with a hollow portion 25 into which the projection 18 of the laminated core body 6 is inserted.

The first flange portion 22 is formed into a rectangular shape extending along the edge of the one end of the trunk portion 21 to open one end of the hollow portion 25. Similarly, the second flange portion 23 is formed into a rectangular shape extending along the edge of the other end of the trunk portion 21 to open the other end of the hollow portion 25. The second flange portion 23 protrudes from the trunk portion 21 to be larger in size than the first flange portion 22.

The substrate mounting portion 24 is provided at one short side (the upper side in FIG. 4) of the second flange portion 23. Two pin terminals 9 are inserted into the substrate mounting portion 24 to protrude from the upper surface of the substrate mounting portion 24. The winding starting end 7a and the winding finishing end 7b of the coil wire 7 are respectively fixed to the pin terminals 9. In the following description, the surface of the substrate mounting portion 24 into which the pin terminals 9 are inserted will be referred to as a "terminal surface 24a".

Two kinds of coil winding methods are employed in the bobbins 20 in accordance with the present embodiment. Specifically, in the bobbin 20A shown in FIG. 7, a winding starting section X from the winding starting end portion 7a of the coil wire 7 to a winding starting position 7c of the trunk portion 21 and a winding finishing section Y from a winding finishing position 7d of the trunk portion 21 to the winding finishing end portion 7b of the coil wire 7 intersect each other when seen in the axial direction 10a. The bobbin that employs this coil winding method will be sometimes referred to as "bobbin 20A" (first bobbin) herein below.

Figure 8:
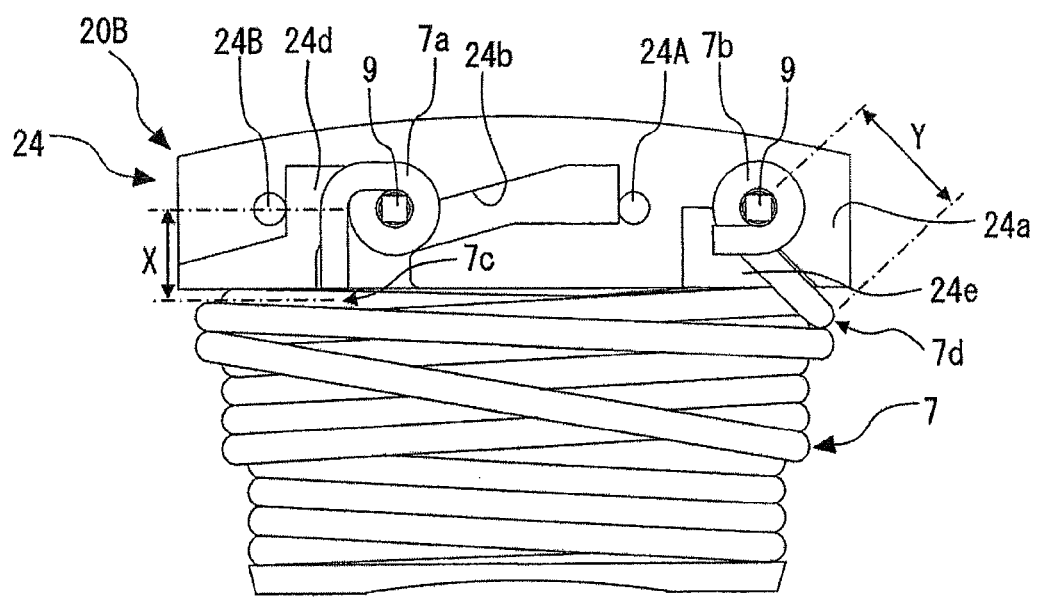
FIG. 8 is a plan view of another bobbin wound with a coil wire, which is adjacent to the bobbin shown in FIG. 7, showing the bobbin according to an embodiment.

In contrast, in the bobbin 20B shown in FIG. 8, the winding starting section X extending from the winding starting end portion 7a of the coil wire 7 to the winding starting position 7c of the trunk portion 21 and the winding finishing section Y extending from the winding finishing position 7d of the trunk portion 21 to the winding finishing end portion 7b do not intersect each other when seen in the axial direction 10a. The bobbin that employs this coil winding method will be sometimes referred to as "bobbin 20B" (second bobbin) herein below.

The terminal surface 24a of the substrate mounting portion 24 has a structure that enables the winding starting section X and the winding finishing section Y of the coil wire 7 to easily intersect each other. Specifically, as shown in FIGS. 4 to 6, a first groove 24b which guides the winding starting section X of the coil wire 7 and a second groove 24c which guides the winding finishing section Y of the coil wire 7 to intersect the winding starting section X are provided in the terminal surface 24a of the substrate mounting portion 24. A third groove 24d and a fourth groove 24e, which respectively guide the winding starting section X and the winding finishing section Y of the coil wire 7 not to intersect each other, are provided in the terminal surface 24a of the substrate mounting portion 24.

Figure 7:
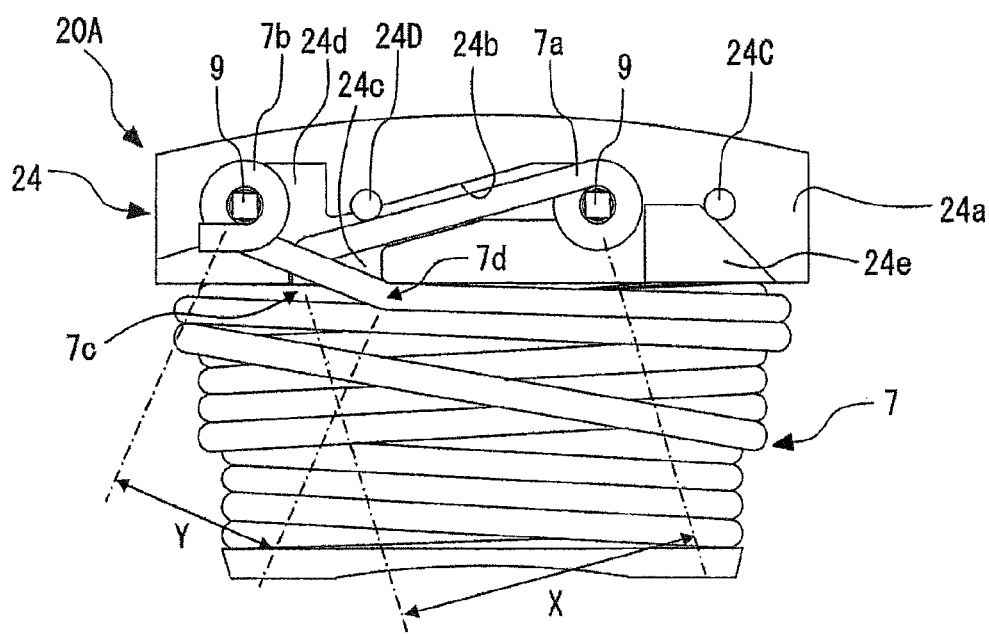
FIG. 7 is a plan view of one bobbin wound with a coil wire, showing the bobbin according to the embodiment.

A recess 24h deeper than the grooves 24b to 24d is formed in an end portion of the third groove 24d at the side of the trunk portion 21. The recess 24h guides the winding starting section X of the coil wire 7 to the winding starting position 7c of the trunk portion 21. Particularly, as shown in FIG. 7, in the bobbin 20A in which the winding starting section X and the winding finishing section Y of the coil wire 7 intersect each other when seen in the axial direction 10*a*, the coils 14 guided by the first groove 24*b* is fitted in the recess 24*h*. Thus, a height difference occurs between the winding starting section X and the winding finishing section Y of the coil wire 7. This makes it possible to have the winding starting section X and the winding finishing section Y intersect each other while avoiding mutual interference of the winding starting section X and the winding finishing section Y.

Four pin holes 24A to 24D, into which the pin terminals 9 are inserted, are formed in the terminal surface 24*a* of the substrate mounting portion 24. The two pin terminals 9 are selectively inserted into one of the pin holes 24A and 24C and one of the pin holes 24B and 24D, respectively. The pin holes 24A and 24C are spaced apart by a predetermined distance in the rotation direction of the rotor 3 (in the direction indicated by an arrow A in FIG. 5). Similarly, the pin holes 24B and 24D are spaced apart by a predetermined distance in the rotation direction of the rotor 3 (in the direction indicated by the arrow A in FIG. 5).

As shown in FIG. 7, in the bobbin 20A in which the winding starting section X and the winding finishing section Y of the coil wire 7 intersect each other when seen in the axial direction 10*a*, the pin terminal 9 (first pin) for winding the winding starting end portion 7*a* of the coil wire 7 is inserted into the pin hole 24A (first pin hole), and the pin terminal 9 (second pin) for winding the winding finishing end portion 7*b* of the coil wire 7 is inserted into the pin hole 24B (second pin hole).

On the other hand, as shown in FIG. 8, in the bobbin 20B in which the winding starting section X and the winding finishing section Y of the coil wire 7 do not intersect each other when seen in the axial direction 10*a*, the pin terminal (first pin) for winding the winding starting end portion 7*a* of the coil wire 7 is inserted into the pin hole 24D (first pin hole), and the pin terminal 9 (second pin) for winding the winding finishing end portion 7*b* of the coil wire 7 is inserted into the pin hole 24C (second pin hole). The insertion positions of the pin terminals 9 shown in FIG. 4 correspond to the bobbin 20B.

In the rotary electric machine 1, as shown in FIG. 3, the bobbin 20A and the bobbin 20B are alternately arranged to adjoin each other in the circumferential direction. Specifically, with respect to the U-phase, the V-phase and the W-phase, the bobbins 20A and 20B corresponding to the coils differing 180 degrees in electrical angle from each other are disposed adjacent to each other. The positions of the winding starting end portion 7*a* and the winding finishing end portion 7*b* of the coil wire 7 in the bobbin 20A are opposite to those in the bobbin 20B along the rotation direction. Therefore, if the bobbin 20A and the bobbin 20B are disposed adjacent to each other, the winding finishing end portions 7*b* of the coil wires 7 can adjoin each other in each of the phases.

<Circuit Configuration of Substrate 8>

Figure 9:
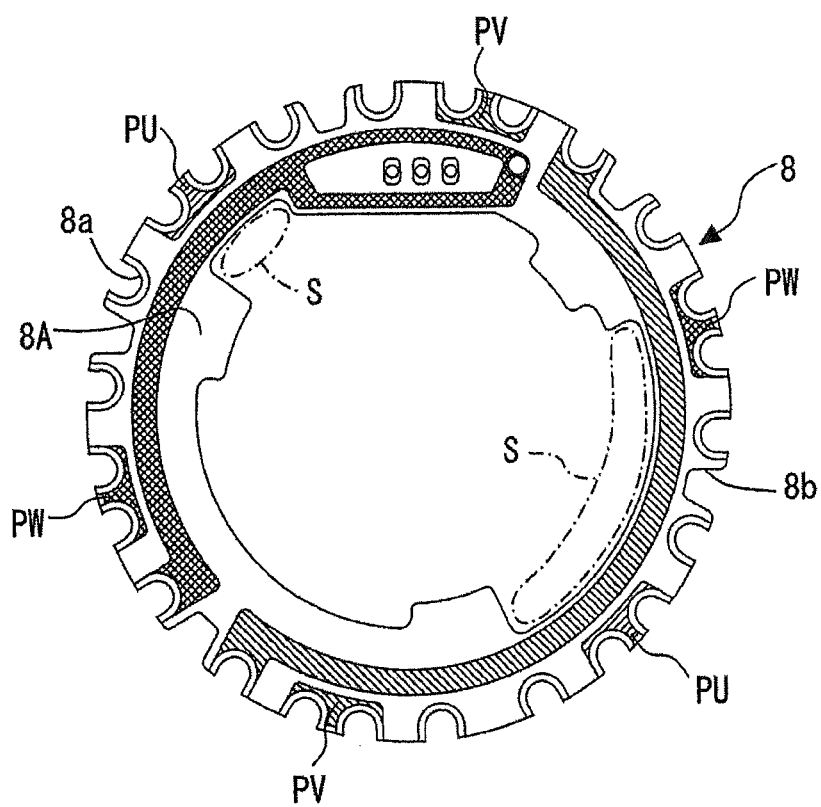
FIG. 9 is a plan view showing a front surface of a substrate in the rotary electric machine according to the embodiment.
Figure 10:
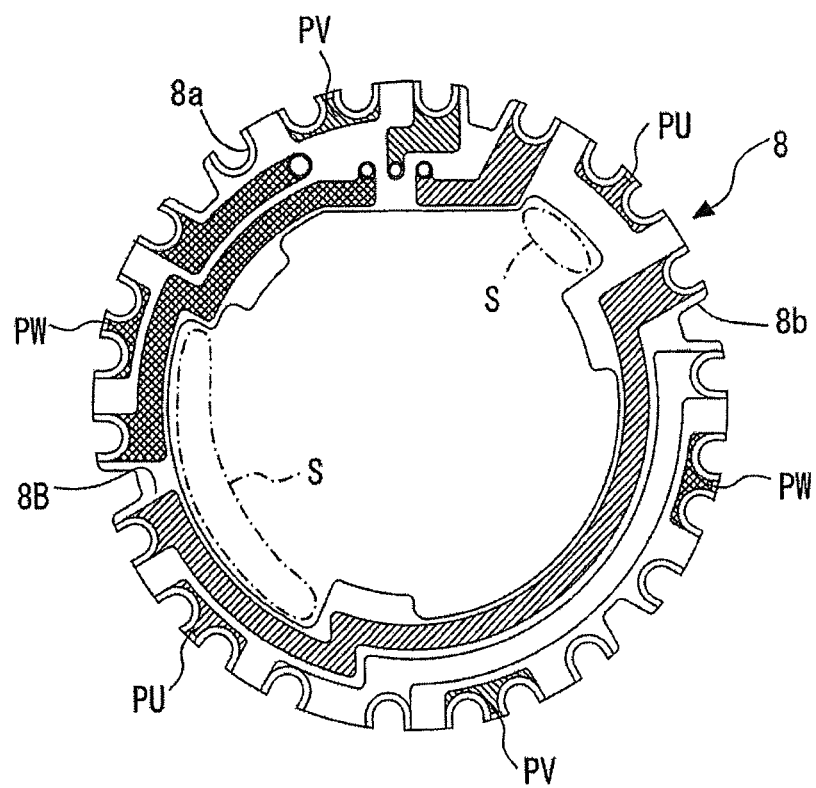
FIG. 10 is a plan view showing a rear surface of the substrate in the rotary electric machine according to the embodiment.

Circuit patterns for connecting the coil wires 7 of the respective bobbins 20 in a predetermined pattern (in a wire connection pattern shown in FIG. 3) are formed in the substrate 8. FIG. 9 shows a circuit pattern formed on a front surface 8A of the substrate 8. FIG. 10 shows a circuit pattern formed on a rear surface 8B of the substrate 8. In FIGS. 9 and 10, reference symbols PU, PV and PW designate wire connection patterns for connecting the winding finishing end portions 7*b* of the coil wires 7 of the adjacent bobbins 20A and 20B in each of the U-phase, the V-phase and the W-phase. Each of the wire connection patterns PU, PV and PW is formed by interconnecting adjacent through-holes 8*a*.

Figure 11:
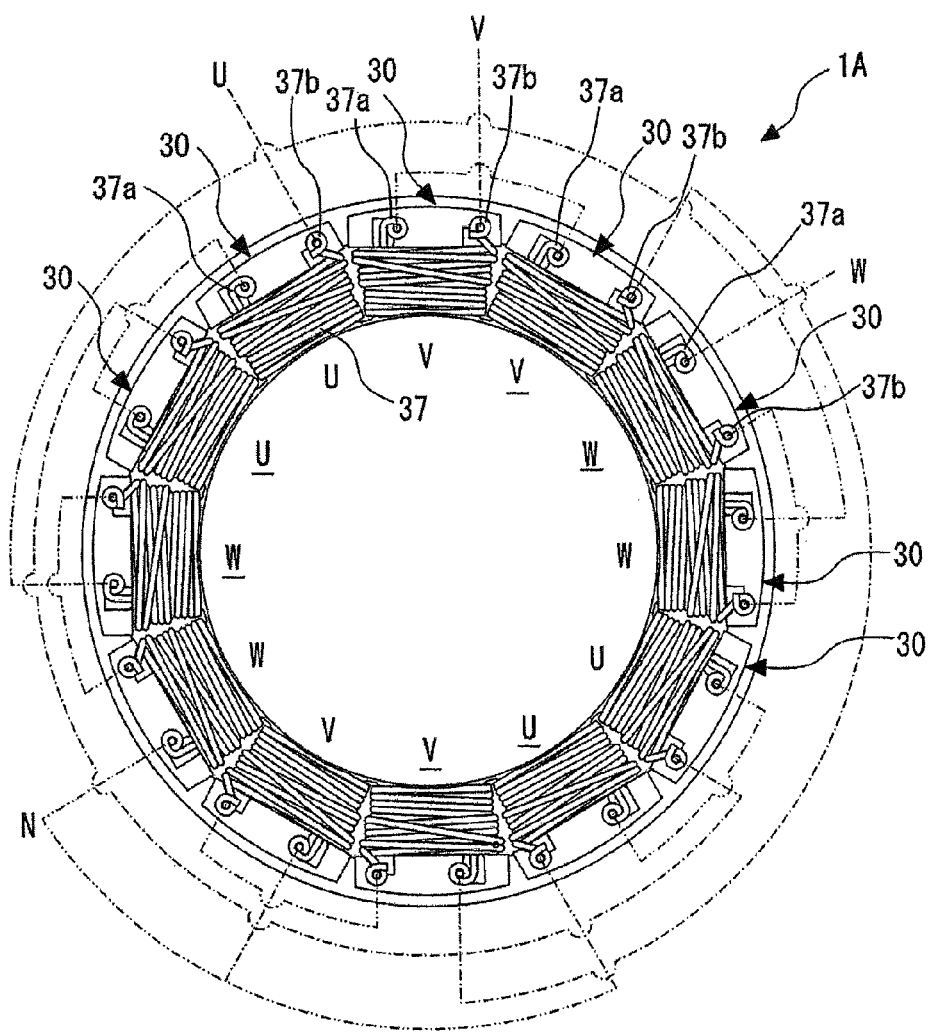
FIG. 11 is a view for explaining an arrangement example of bobbins in a rotary electric machine according to a comparative example.
Figure 12:
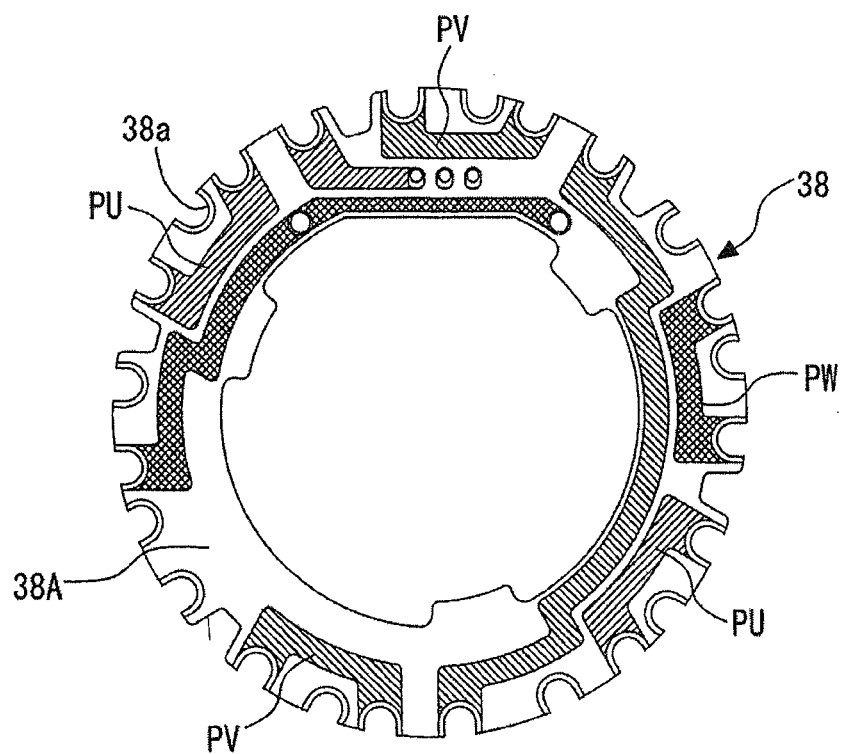
FIG. 12 is a plan view showing a front surface of a substrate in the rotary electric machine according to the comparative example.
Figure 13:
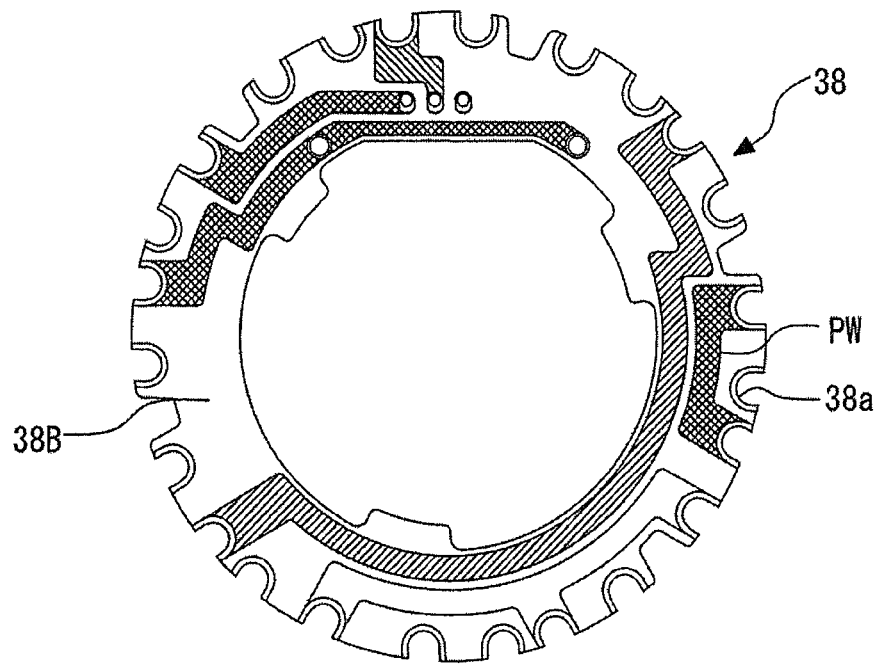
FIG. 13 is a plan view showing a rear surface of the substrate in the rotary electric machine according to the comparative example.

The present embodiment will be described using a comparative example shown in FIGS. 11 to 13. As shown in FIG. 11, in a rotary electric machine 1A in accordance with a comparative example, each of bobbins 30 is configured such that, as in the bobbin 20B of the aforementioned embodiment, the winding starting section X and the winding finishing section Y of the coil wire 7 do not intersect each other when seen in the axial direction 10*a*. Further, the respective bobbins 30 employ the same coil winding method. For that reason, the positions of the winding starting end portions 7*a* and the winding finishing end portions 7*b* of the coil wires 7 in the respective bobbins 30 are in the same positional relationship along the rotation direction. As a result, the degree of freedom in arranging the wire connection patterns in the substrate 8 becomes lower, and the wire connection patterns grow complex.

More specifically, as shown in FIG. 11, in the rotary electric machine 1A, the winding starting end portions 37*a* and the winding finishing end portions 37*b* of the respective bobbins 30 are alternately positioned along the circumferential direction. As a result, as shown in FIGS. 12 and 13, in the substrate 38 of the rotary electric machine 1A in accordance with the comparative example, each of the wire connection patterns PU, PV and PW for interconnecting the winding starting end portions 7*a* or the winding finishing end portions 7*b* of the coil wires 7 of the adjacent bobbins 30 in each of the U-phase, the V-phase and the W-phase becomes a wire connection pattern in which other through-hole(s) 38*a* is interposed between the winding starting end portions 7*a* or between the winding finishing end portions 7*b* by detouring the corresponding through-hole(s) 38*a*. This makes the circuit patterns complex and makes it necessary to increase a width spanning from the inner periphery of the substrate 38 to the outer periphery thereof. As a result, this leads to an increase in the size of the rotary electric machine 1A.

In the rotary electric machine 1 according to the present embodiment, as described above, there are employed two kinds of bobbins 20A and 20B in which the positions of the winding starting end portions 7*a* and the winding finishing end portions 7*b* of the coil wires 7 in the bobbins 20A are opposite to those in the bobbins 20B along the rotation direction. It is therefore possible to form the circuit patterns of the substrate 8 into predetermined wire connection patterns by appropriately disposing the bobbins 20A and 20B (namely, by appropriately inverting the positions of the winding starting end portions 7*a* and the positions of the winding finishing end portions 7*b*). This makes it possible to increase the degree of freedom in arranging the wire connection patterns in the substrate 8. As a result, it becomes possible to simplify the circuit patterns of the substrate 8.

Specifically, as shown in FIGS. 9 and 10, the respective wire connection patterns PU, PV and PW are formed by interconnecting the adjacent through-holes 8*a*. This makes it possible to simplify the overall circuit patterns of the substrate 8.

As a result of the simplification of the circuit patterns of the substrate 8, it becomes possible, as in the present embodiment, to make the substrate 8 as a double-side substrate in which circuit patterns are formed on the opposite surfaces thereof. Therefore, as compared with a case where the substrate 8 is made from a multi-layer substrate, it is possible to reduce the size of the rotary electric machine 1 and to save the costs. Further, as a result of the simplification of the circuit patterns, it is possible to reduce the arrangement area of the circuit patterns. This makes it possible to increase the space in the substrate 8 in which a resin for molding the bobbins 20 flows. For example, in the substrate 8 shown in FIGS. 9 and 10, as compared with the substrate 38 of the comparative example shown in FIGS. 12 and 13, it is possible to increase the opening area just as much as the space S. Thus, a resin is easy to flow, which makes it possible to reduce generation of molding defects.

In the present embodiment, the first groove 24b and the second groove 24c are formed in the terminal surface 24a of the substrate mounting portion 24. The first groove 24b guides the winding starting section X of the coil wire 7 of the bobbin 20A. The second groove 24c guides the winding finishing section Y of the coil wire 7 of the bobbin 20A. By guiding the winding starting section X and the winding finishing section Y of the coil wire 7 with the respective grooves 24b and 24c in this manner, it is possible to fix routes of the winding starting section X and the winding finishing section Y and to smoothly intersect the winding starting section X and the winding finishing section Y each other when seen in the axial direction 10a.

Further, by allowing the winding starting section X and the winding finishing section Y to pass through the respective grooves 24b and 24c, it is possible to prevent concentration of stresses in the vicinity of the terminal ends of the coil wire 7 and to enhance the durability of the coil wire 7. By forming the respective grooves 24b and 24c (or the grooves 24d and 24e) into a depressed shape, it is possible to secure a space for guidance of the coil wire 7. Thus, the substrate 8 can be mounted on the terminal surface 24a of the substrate mounting portion 24.

In the present embodiment, the third groove 24d and the fourth groove 24e are additionally formed on the terminal surface 24a of the substrate mounting portion 24. Thus, in the bobbin 20A, the coil wire 7 can be wound using the first groove 24b and the second groove 24c such that the winding starting section X and the winding finishing section Y intersect each other when seen in the axial direction 10a. In the bobbin 20B, the coil wire 7 can be wound using the third groove 24d and the fourth groove 24e such that the winding starting section X and the winding finishing section Y do not intersect each other when seen in the axial direction 10a.

Accordingly, it is possible to, using the bobbins of the same shape, provide two kinds of bobbins, namely the bobbin 20A in which the winding starting section X and the winding finishing section Y intersect each other when seen in the axial direction 10a and the bobbin 20B in which the winding starting section X and the winding finishing section Y do not intersect each other when seen in the axial direction 10a. For that reason, the bobbins can be manufactured by one kind of mold. Therefore, as compared with a case where the bobbins are manufactured by two kinds of molds, it is possible to save the costs. Since the bobbins 20 of one kind are used, management of the bobbins 20 becomes easier.

In the present embodiment, at least two pin holes are provided on the terminal surface 24a of the substrate mounting portion 24. For example, in the bobbin 20A, the winding starting end portion 7a of the coil wire 7 is wrapped around the pin terminal 9 as the first pin inserted into the pin hole 24A. The winding finishing end portion 7b of the coil wire 7 is wrapped around the pin terminal 9 as the second pin inserted into the pin hole 24B. By wrapping the winding starting end portion 7a and the winding finishing end portion 7b of the coil wire 7 around the pin terminals 9 in this manner, it is possible to firmly fix the winding starting end portion 7a and the winding finishing end portion 7b through the use of a solder or the like. Use of the pins as connecting terminals makes it possible to connect the winding starting end portion 7a and the winding finishing end portion 7b of the coil wire 7 to the substrate 8 in an electrically stable manner.

In the present embodiment, four pin holes 24A to 24D are provided on the terminal surface 24a of the substrate mounting portion 24. Two pin holes 24A and 24C are spaced apart by a predetermined distance in the rotation direction. Accordingly, the position of the winding starting end portion 7a of the coil wire 7 in the bobbin 20A (the position of the winding finishing end portion 7b in the bobbin 20B) can be selected by inserting the pin terminal 9 into one of the pin holes 24A and 24C. Since the other second pin holes 24B and 24D are similarly arranged, it is possible to select the position of the winding finishing end portion 7b in the bobbin 20A (the position of the winding starting end portion 7a in the bobbin 20B).

As a result, in case where the bobbins 20 wound with the coils of the same phase are disposed adjacent to each other to provide a wire connection pattern in which the winding finishing end portions 7b of the adjacent coil wires are connected to each other as in the rotary electric machine 1 of the present embodiment, the pin hole 24B is selected in the bobbin 20A and the pin hole 24C is selected in the bobbin 20B such that the winding finishing end portions 7b of the coil wires 7 are positioned closer to each other. Thus, it is possible to make shortest the wire connection patterns PU, PV and PW for interconnecting the winding finishing end portions 7b. This makes it possible to simplify the circuit patterns.

Further, in case where the bobbins 20 wound with the coils of different phases are disposed adjacent to each other as in the rotary electric machine 1 of the present embodiment, the pin hole 24A is selected for the winding starting end portion 7a of the coil wire 7 in the bobbin 20A and the pin hole 24D is selected for the winding starting end portion 7a of the coil wire 7 in the bobbin 20B such that the winding starting ends 7a of the adjacent coil wires 7 are positioned farther from each other.

Thus, it is possible to secure a distance for the insulation between the winding starting end portions 7a of the coils of different phases. By disposing the winding starting end portions 7a of the coil wires 7 farther from each other in this manner, a space (a groove 8b shown in FIGS. 9 and 10) in which a resin for molding the coils flows can be formed in the corresponding position of the substrate 8. This makes it possible to reduce the influence of the pressure of the resin on the winding starting end portions 7a.

By forming a pair of pin holes with respect to each of the winding starting end portion 7a and the winding finishing end portion 7b of the coil wire 7, it is possible to make different the relative positions of the pin terminals 9 corresponding to the winding starting end portions 7a and the winding finishing end portions 7b in the bobbins 20 disposed adjacent to each other. Therefore, if the bobbins 20 are erroneously disposed (for example, if the bobbins 20A or the bobbins 20B are disposed adjacent to each other), the pin terminals 9 interfere with the substrate 8 without passing through the corresponding through-holes 8a of the substrate 8 during the course of mounting the substrate 8. This provides an effect in that an erroneously disposed bobbin 20 can be identified.

Further, in the present embodiment, the rotary electric machine 1 is configured to have a slot combination of ten poles and twelve slots (10P-12S). In this case, there can be provided a wire connection pattern in which the winding starting end portions 7a or the winding finishing end portions 7b of the coil wires 7 are connected to each other.

Therefore, the bobbin configuration according to the present embodiment is particularly useful.

MODIFIED EXAMPLES

The present disclosure is not limited to the embodiment described above but may be differently modified without departing from the sprit and scope of the present disclosure. Various modified examples will now be described.

(1) A Case where a Substrate Mounting Protrusion is Formed on a Terminal Surface of a Substrate Mounting Portion In the aforementioned embodiment, the substrate 8 is mounted to the terminal surface 24*a* of the substrate mounting portion 24. Alternatively, a substrate mounting protrusion may be formed on the terminal surface 24*a* and a gap may be provided between the terminal surface 24*a* and the substrate 8. The present modified example will be described with reference to FIGS. 14 to 17.

Figure 14:
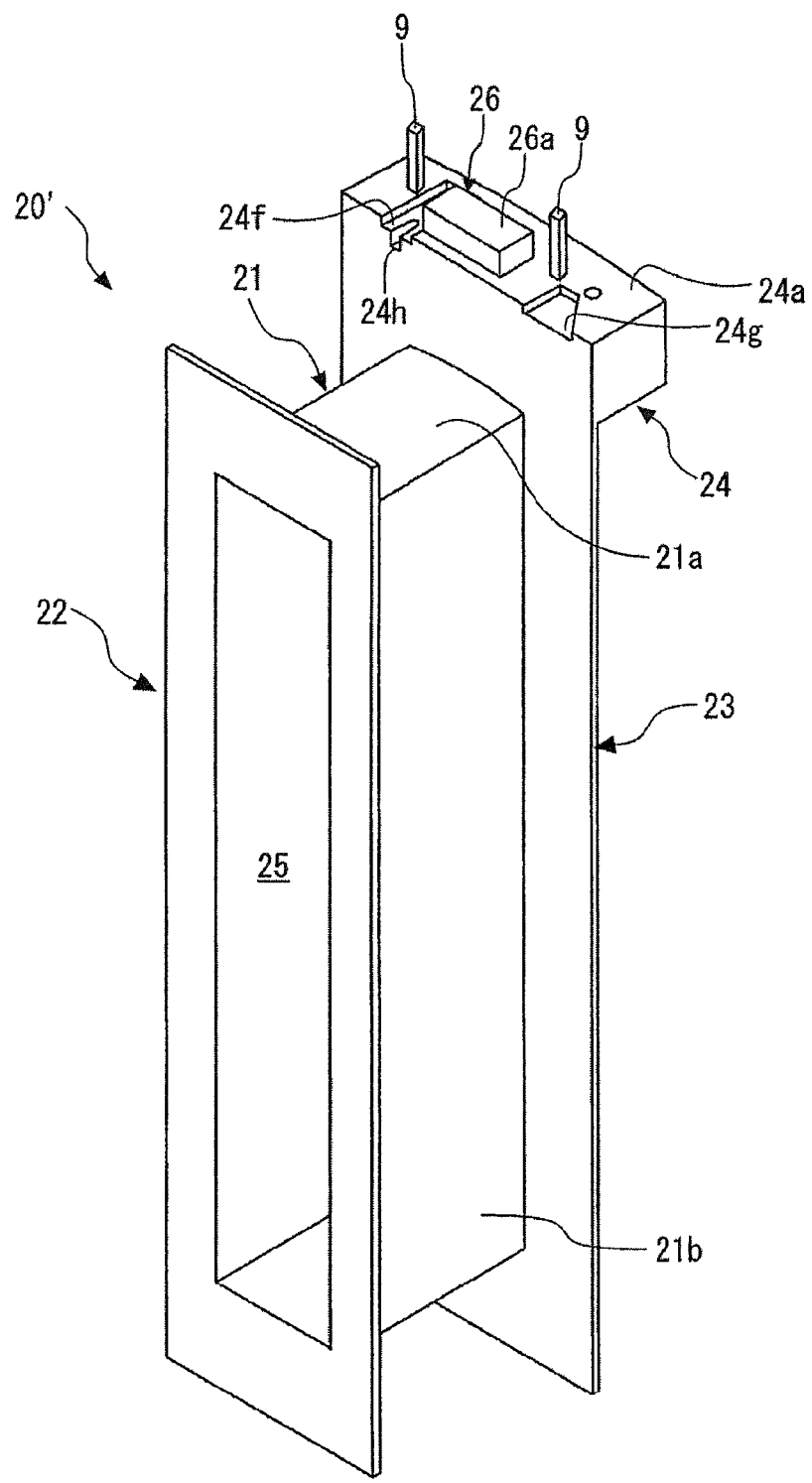
FIG. 14 is a perspective view of a bobbin according to a modified example of the embodiment, in which a substrate mounting protrusion is arranged on a terminal surface of a substrate mounting portion.
Figure 15:
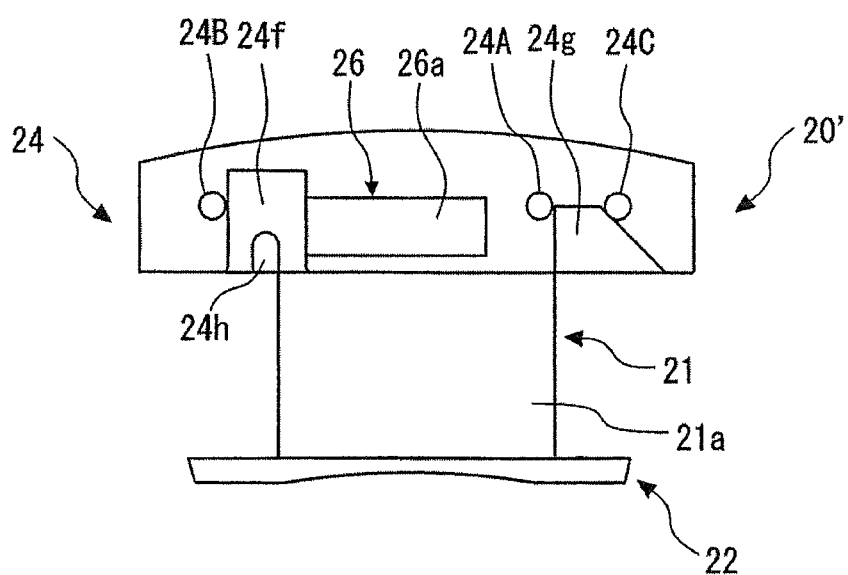
FIG. 15 is a plan view of the bobbin according to the modified example.

As shown in FIGS. 14 and 15, the bobbin 20' of the present modified example includes a substantially rectangular parallelepiped protrusion 26 arranged on the terminal surface 24*a* of the substrate mounting portion 24. The protrusion 26 has a mounting surface 26*a* to which the substrate 8 is mounted. Thus, a gap is formed between the terminal surface 24*a* and the substrate 8 mounted to the mounting surface 26*a* of the protrusion 26. The gap can be used to wrap the end portion of the coil wire 7. In the present modified example, unlike the aforementioned embodiment, instead of the first groove 24*b* and the second groove 24*c* intersecting each other when seen in the axial direction 10*a*, grooves 24*f* and 24*g* are formed.

The groove 24*f* is a groove that guides the winding starting section X or the winding finishing section Y of the coil wire 7. The groove 24*g* is a groove that guides the winding finishing section Y of the coil wire 7. In the present modified example, three pin holes 24A, 24B and 24C for the insertion of the pin terminals 9 are formed on the terminal surface 24*a*, and the pin hole 24D is not formed. Other configurations of the bobbin 20' in accordance with the present modified example are the same as the configurations of the bobbin 20 of the aforementioned embodiment and, therefore, will not be described herein.

Figure 16:
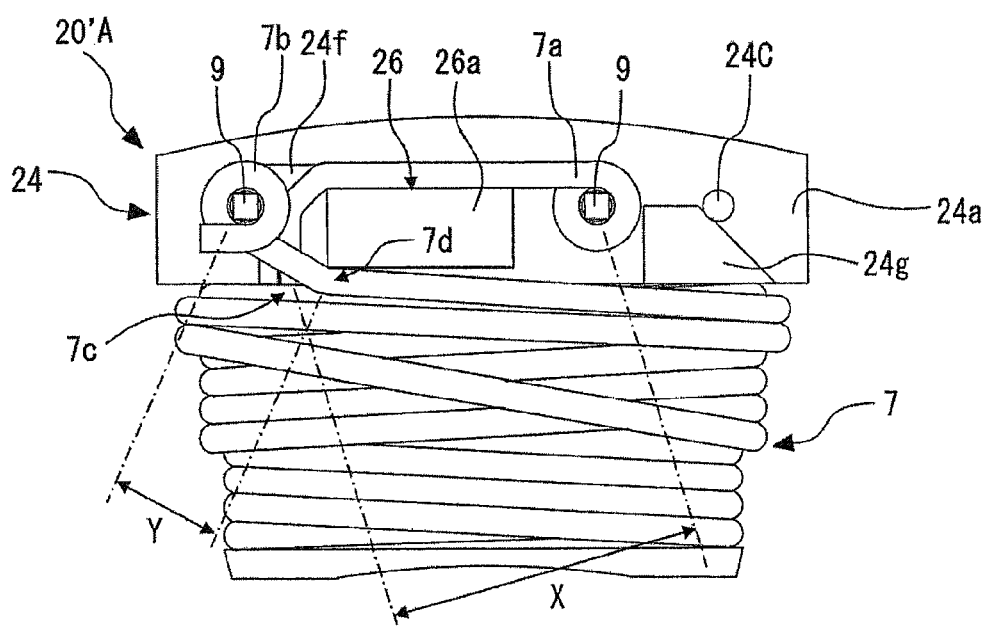
FIG. 16 is a plan view of one bobbin wound with a coil wire, showing the bobbin according to the modified example.

FIG. 16 shows a bobbin 20'A in which the winding starting section X and the winding finishing section Y of the coil wire 7 intersect each other when seen in the axial direction. In the bobbin 20'A, the pin terminal 9 (the first pin) around which the winding starting end portion 7*a* of the coil wire 7 is wrapped is inserted into the pin hole 24A (the first pin hole). The pin terminal 9 (the second pin) around which the winding finishing end portion 7*b* of the coil wire 7 is wrapped is inserted into the pin hole 24B (the second pin hole). The winding starting section X of the coil wire 7 is drawn to the groove 24*f* around the protrusion 26 and is guided to the winding starting position 7*c* of the trunk portion 21 by the grooves 24*f* and 24*h*.

The winding finishing section Y of the coil wire 7 is a section extending from the winding finishing position 7*d* of the trunk portion 21 corresponding to one corner of the protrusion 26 to the winding finishing end portion 7*b*. As in the aforementioned embodiment, the recess 24*h* enables the winding starting section X and the winding finishing section Y to intersect each other while avoiding mutual interference. The insertion positions of the pin terminals 9 shown in FIG. 14 correspond to the bobbin 20'A.

Figure 17:
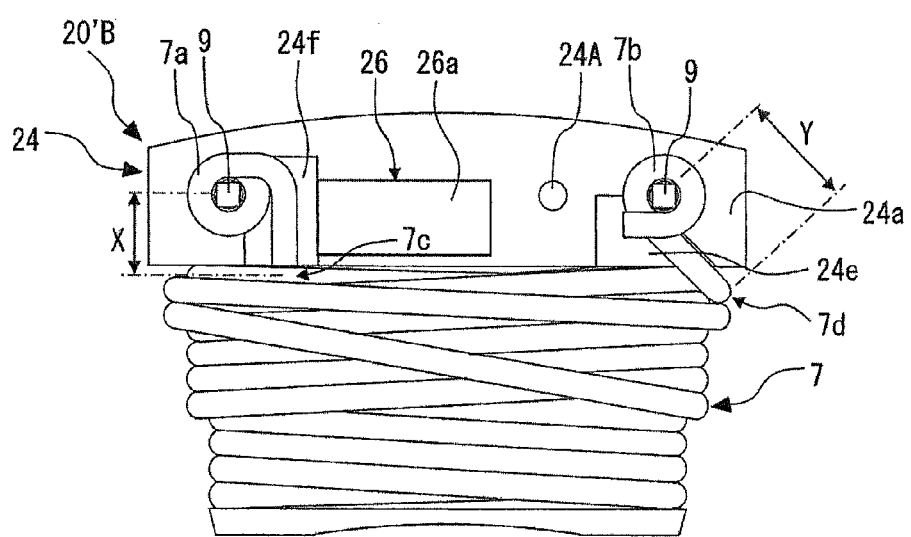
FIG. 17 is a plan view of another bobbin wound with a coil wire, which is adjacent to the bobbin shown in FIG. 16, showing the bobbin according to the modified example.

On the other hand, FIG. 17 shows a bobbin 20'B in which the winding starting section X and the winding finishing section Y of the coil wire 7 do not intersect each other when seen in the axial direction. In the bobbin 20'B, the pin terminal 9 (the first pin) around which the winding starting end portion 7*a* of the coil wire 7 is wrapped is inserted into the pin hole 24B (the first pin hole). The pin terminal 9 (the second pin) around which the winding finishing end portion 7*b* of the coil wire 7 is wrapped is inserted into the pin hole 24C (the second pin hole).

According to the modified example described above, the bobbins 20'A and 20'B employing two kinds of coil winding methods can be provided using one kind of bobbin 20'. It is therefore possible to obtain the same effects as available in the aforementioned embodiment. The installation of the protrusion 26 eliminates the need to form the first groove 24*b* and the second groove 24*c* intersecting each other when seen in the axial direction 10*a*, which are employed in the aforementioned embodiment. This makes it possible to simplify the configuration of the bobbins.

(2) A Case where Two Kinds of Bobbins are Used

Figure 18:
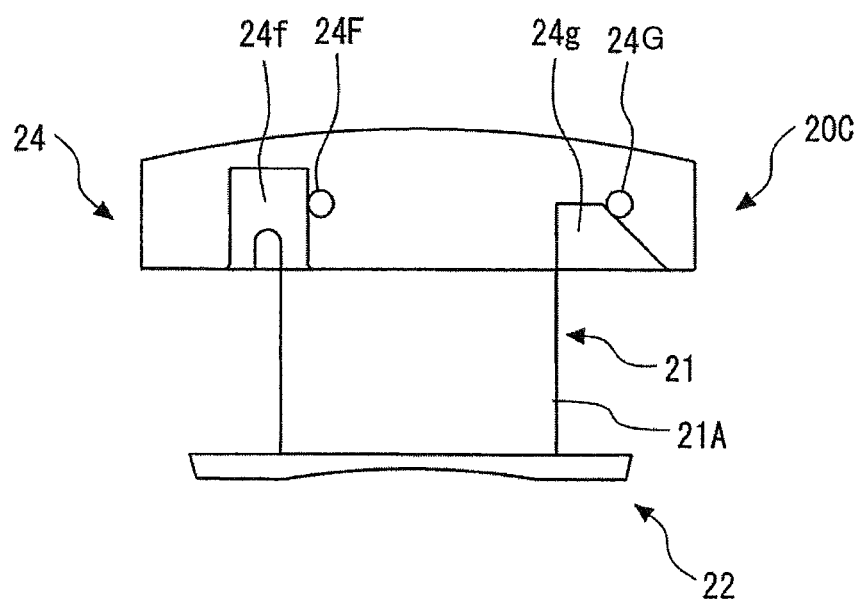
FIG. 18 is a plan view of one bobbin in a rotary electric machine according to another modified example in which two kinds of bobbins are used.
Figure 19:
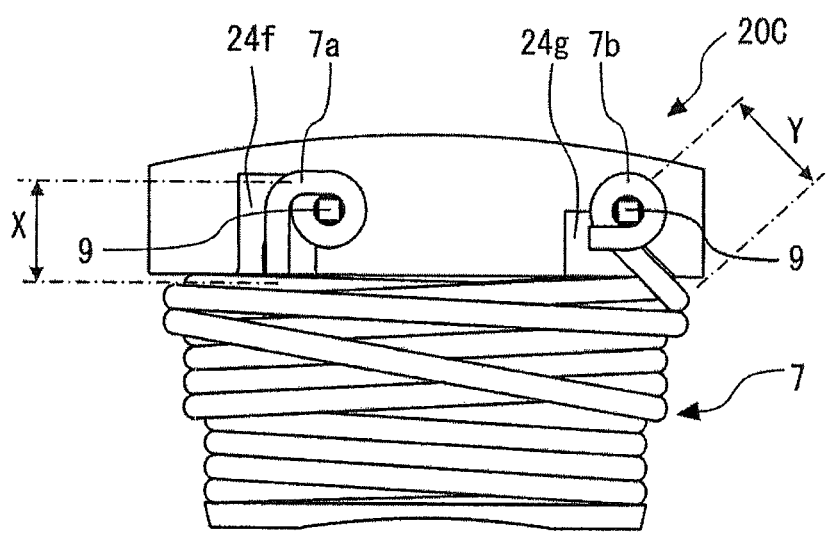
FIG. 19 is a plan view of the bobbin wound with a coil wire, showing the bobbin shown in FIG. 18.

In the aforementioned embodiment, the bobbins 20*a* and 20B are provided using the common bobbins 20. However, since the bobbin 20B is configured such that the winding starting section X and the winding finishing section Y of the coil wire 7 do not intersect each other when seen in the axial direction 10*a*, it may be possible to use, e.g., a bobbin 20C having a structure shown in FIG. 18 instead of the bobbin 20B. The bobbin 20C includes two grooves 24*f* and 24*g* and two pin holes 24F and 24G. As shown in FIG. 19, the winding starting section X of the coil wire 7 is guided by the groove 24*f* while the winding finishing section Y is guided by the groove 24*g*. Thus, the winding starting section X and the winding finishing section Y of the coil wire 7 can be configured not to intersect each other when seen in the axial direction 10*a*.

(3) Other Modified Examples

In the embodiment and the modified examples described above, description has been made on a case where the present disclosure is applied to the rotary electric machine having the slot combination of ten poles and 12 slots (10P-12S). However, it may be possible to employ other slot combinations in which coils having the same phase but differing 180 degrees in electrical angle from each other are disposed adjacent to each other. For example, the present disclosure may be effectively applied to a rotary electric machine of eight poles and nine slots (8P-9S), a rotary electric machine of ten poles and nine slots (10P-9S) or a rotary electric machine of fourteen poles and twelve slots (14P-12S).

While the foregoing description has been made by taking, as an example, a case where the rotary electric machine 1 is an inner-rotor-type rotary electric machine having the rotor 3 arranged inside the stator 2, the present disclosure may be applied to an outer-rotor-type rotary electric machine having the rotor 3 arranged outside the stator 2. While the foregoing description has been made by taking, as an example, a case where the bobbin of the present embodiment is used in the stator 2 of the rotary electric machine 1, the bobbin may be applied to the rotor 3.

In addition to the above, the embodiment and the respective modified embodiments may be appropriately combined.

While not specifically mentioned one by one, the present embodiment may be changed in many different forms without departing from the spirit thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A rotary electric machine comprising:
a stator having the stator core;
a rotor; and
a bobbin mounted to the stator core and configured to electrically insulate the stator core from a first coil wire to be wound around the bobbin,
wherein the bobbin includes:
a coil winding portion around which the first coil wire is to be wound; and
a terminal fixing portion to which a winding starting end portion and a winding finishing end portion of the first coil wire are to be fixed,
wherein the terminal fixing portion includes a first groove set and a second groove set and the bobbin is configured to allow the first coil wire to be wound around the coil winding portion through the use of one of the first groove set and the second groove set,
wherein the first groove set includes a first groove configured to guide a winding starting section extending from the winding starting end portion of the first coil wire to a winding starting position of the coil winding portion and a second groove configured to guide a winding finishing section extending from a winding finishing position of the coil winding portion to the winding finishing end portion of the first coil wire to intersect the winding starting section when seen in an axial direction,
wherein the second groove set includes a third groove configured to guide the winding starting section and a fourth groove configured to guide the winding finishing section not to intersect the winding starting section when seen in the axial direction,
wherein the rotary electric machine further comprises:
a wire connection substrate disposed at one axial end of the bobbin and provided with a wire connection pattern for connecting the first coil wire in a predetermined wire connection pattern;
a bobbin body including the bobbin around which the first coil wire is wound such that a winding starting section of the first coil wire intersects a winding finishing section of the first coil wire when seen in the axial direction; and
an additional bobbin body formed by winding a second coil wire around an additional bobbin,
wherein the additional bobbin includes an additional coil winding portion around which the second coil wire is wound and an additional terminal fixing portion to which a winding starting end portion and a winding finishing end portion of the second coil wire are fixed,
wherein the additional bobbin body is configured such that, when seen in the axial direction, a winding starting section extending from the winding starting end portion of the second coil wire wound around the additional bobbin to a winding starting position of the additional coil winding portion does not intersect a winding finishing section extending from a winding finishing position of the additional coil winding portion to the winding finishing end portion of the second coil wire, and
wherein the bobbin and the additional bobbin are disposed adjacent to each other in a circumferential direction of the stator.

2. The rotary electric machine of claim 1, wherein the terminal fixing portion includes at least two pin holes into which a first pin for wrapping the winding starting end portion of the first coil wire and a second pin for wrapping the winding finishing end portion of the first coil wire are inserted.

3. The rotary electric machine of claim 2, wherein the terminal fixing portion includes two first pin holes spaced apart from each other by a predetermined distance in a rotation direction, and two second pin holes spaced apart from each other by a predetermined distance in the rotation direction, the first pin is inserted into one of the first pin holes while the second pin is inserted into one of the second pin holes.

4. The rotary electric machine of claim 1, which has a slot combination in which coils having the same phase but differing 180 degrees in electrical angle from each other are disposed adjacent to each other.

* * * * *